United States Patent Office 3,579,360
Patented May 18, 1971

3,579,360
LYOPHILISING A CARBON DIOXIDE SOLUTION
Louis René Rey, St.-Legier, Switzerland, Monick Dousset, Paris, France, and Françoise Chauffard, Vevey, Switzerland, assignors to Societe d'Assistance Technique pour Produits Nestle S.A.
No Drawing. Filed July 6, 1967, Ser. No. 651,378
Claims priority, application Switzerland, July 8, 1966, 10,054
Int. Cl. A23f 1/06; F26b 5/06
U.S. Cl. 99—199                    5 Claims

ABSTRACT OF THE DISCLOSURE

Porous composite materials, consisting of a continuous phase and a disperse phase in intimate association with the continuous phase may be obtained by the application of freeze-drying techniques. The materials may be prepared either by freeze-drying a first solution, impregnating the dry material with a second solution and again freeze-drying, or by freeze-drying a system consisting of two solutes dissolved in different solvents which may be immiscible. Freeze-drying of both aqueous and non-aqueous systems is envisaged.

---

The present invention is concerned with novel porous composite materials and with a process for their production.

Freeze-drying, or lyophilisation techniques have so far been principally applied to the dehydration of various products or substances having a high water content. Studies have also been undertaken in the pharmaceutical and food industries with a view to widening the scope of application of these methods to include non-aqueous systems. The principal objectives of these studies have been the stabilisation of labile substances and the drying of valuable products in solution in non-aqueous diluents.

The present invention concerns the application of lyophilisation techniques to the production of novel composite materials rather than to the drying of different substances.

According to the invention, there is provided a composite material comprising a continuous phase consisting essentially of a porous structure of a dry substance, there being included within the pores of said structure at least one further substance, different from the first, which has been dried by lyophilisation "in situ."

The present invention also provides a process for producing composite materials as defined above, which process comprises adding to a porous material, by absorption or adsorption, at least one substance or mixture of substances different from said material and subsequently freezing and lyophilising the resulting composite material.

Preferably, a solution of the first substance or mixture of substances is frozen and lyophilised to provide a dry porous material by elimination of the diluent; a solution of at least one substance or mixture of substances, different from the first is then added to the dry material by absorption or adsorption, and the resulting composite material is frozen and again lyophilised.

The resulting novel product is a porous material which is finely heterogeneous and consists of different substances in close association with each other, but which may be incompatible and soluble in different media.

For example, the continuous phase of the porous material may be composed of a water-soluble solid in which dry particles of a hydrophobic substance are dispersed.

The expression "solution" as used herein is intended to mean not only simple solutions but also emulsions and suspensions in which a solid phase is dispersed in a liquid phase without necessarily being dissolved therein. Depending on the degree of concentration, these solutions are more or less fluid and may be in liquid or pasty condition.

Many different solutions may be used as starting materials in the process, for example, synthetic substances dissolved in organic solvents, foams prepared from aqueous coffee or tea extracts, biscuit masses containing a substantial proportion of water in addition to fat, proteinaceous materials and sugar.

The conditions of lyophilisation are selected according to the nature of the product and the diluent. For freezing, the temperature is generally lowered to 0° C. or less, in most cases to temperatures between −15 and −196° C. The frozen diluent is usually sublimed in a vacuum using a suitable apparatus.

After the first lyophilisation a dry product of porous structure is obtained, and it is used as the continuous phase to produce the desired composite material. The expression "dry product" used herein is intended to designate absence of a liquid phase in the material or substrate. Such a product is capable of absorbing or adsorbing a second solution which, after lyophilisation, is distributed essentially in disperse phase, within the pores of the dry product.

Preferably, the diluent in the second solution is a nonsolvent for the substance or composition making up the initial porous material. The impregnation of the latter by the second solution may be effected in different ways, for example by immersing the dry product in the solution, soaking the product by running the solution over its surface, or by exposing the porous material to a current of saturated vapour. This operation is generally effected at atmospheric pressure; however, to promote the penetration of the solution, in some cases it is preferable to reduce the pressure for a short time.

The second lyophilisation is carried out having regard to the physiochemical properties of the constituents of the impregnation solution. These constituents may be of different types, for example, synthetic resins, therapeutic agents, fertilizers, amino acid salts, vitamines, preservatives, flavourings such as chocolate or fruit extracts, etc., volatile aromatic fractions extracted from natural substances such as coffee, tea or chicory, or synthetic flavourings, for example artificial aromas. The impregnated porous material is first frozen at a convenient temperature and thereafter it is dried under vacuum in a suitable lyophilisation chamber. Sometimes, for example when liquid carbon dioxide is used as a diluent, resort to a lyophilisation apparatus may be unnecessary.

The resulting porous composite material consists of incompatible elements in close association and which are soluble in different media.

The impregnation of the porous material and subsequent lyophilisation may be repeated several times, using each time new solutions, thus obtaining multi-component materials of truly micro-granular structure. These composite materials have specific properties and are of special interest because of their characteristic structure produced by lyophilisation, notably high porosity, large internal surface area and micro-heterogeneity.

Another process according to the invention for preparing the composite materials described herein comprises drying a system containing at least one substance dissolved in two or more different diluents, by direct sublimation.

The system to be dried is described as homogeneous if the diluents are completely miscible and if the solutes are highly soluble in the diluents.

Conversely, the system is heterogeneous if the diluents are immiscible. Under these conditions, it is desirable to prepare a more or less stable emulsion or dispersion of the liquid phases, optionally with addition of emulsifying agents. The liquids may also be homogenised.

Sublimation of the diluents is described as simultaneous when the diluents are removed at substantially equal rates, and it is known as consecutive when one of the diluents sublimes preferentially.

For example, the process may be applied to a system consisting of a 1% aqueous solution of dextran and a 0.1% solution of polystyrene in dioxan, optionally with addition of mineral salts. As the diluents are miscible, and each substance is soluble in its diluent, the system is homogeneous.

On freezing, the homogeneity of the system breaks down, since first the dioxan crystallises and then the water surrounding the dioxan crystals. During the drying step, however, frozen liquid/dry material interface progresses uniformly, and hence the sublimation is simultaneous.

Upon completion of the lyophilisation, a composite material is obtained, containing 1 part of polystyrene per 10 parts of dextran. This material is porous and finely heterogeneous, and in which the two components are in intimate admixture.

Another homogeneous system may be obtained by mixing a 1% solution of polystyrene in dioxan with a 1% solution of polystyrene in carbon tetrachloride. As in the previous case, the homogeneity of the system disappears during freezing as the dioxan separates out first and its crystals are embedded in a continuous phase of frozen carbon tetrachloride.

The lyophilisation, however, proceeds under different conditions from those described above since the sublimation rates of the diluents are unequal. The carbon tetrachloride sublimes rapidly and under a microscope it is possible to see the break-up of the continuous carbon tetrachloride phase leaving behind the dioxan which sublimes more slowly. Examination of the evolved vapours indicates that when all the carbon tetrachloride has been removed around 50% of the dioxan still remain unsublimed.

More frequently, however, the system consists of two immiscible solutions and hence the starting material is an emulsion or a dispersion. Substantially stable emulsions may be prepared by homogenisation in a suitable apparatus, optionally with addition of emulsifying agents. The system is then cooled and each constituent freezes separately according to its properties.

As an illustration, the system consists of a 1% solution of dextran in water and a 1% solution of polystyrene in benzene. A fine emulsion of equal parts of these solutions is prepared.

On freezing, the benzene crystallises first, leaving the water as the disperse phase.

Sublimation of the frozen mass also takes place at different rates within the phases, the benzene being the first to sublime. Under a microscope it is possible to observe the solid/vapour interface as it moves through the benzene phase, leaving behind ice fragments which sublime more slowly. It has been found, however, that there are solvents which sublime less rapidly than water of which paraxylene is an example.

The process is especially suitable for the preparation of lyophilised coffee extracts, starting, for example, from an emulsion consisting of an aqueous solution of coffee solubles and a solution of coffee aromatics and coffee oil in an organic solvent such as a fluorinated hydrocarbon (Freon). The emulsion is frozen rapidly in relatively thin layers and lyophilised under vacuum in a suitable apparatus.

Alternatively, the starting material may be a homogeneous system consisting of an aqueous solution of coffee solubles and a solution of the aromatic and lipid constituents of coffee in dioxan. The two solutions are stirred together and the system frozen in thin layers at —40 to —50° C. The frozen system is then lyophilised under vacuum until all the frozen liquid phase has been sublimed.

In a further modification, the lipid and aromatic coffee constituents may be dissolved in liquid carbon dioxide instead of dioxan. This solution is mixed at a pressure of at least 5.5 kg./cm.$^2$ with an aqueous solution of coffee solubles. By slowly lowering the pressure, at least partial freezing of the mixture may be induced, which may be completed by outside refrigeration. Lyophilisation may be effected under vacuum or at atmospheric pressures.

The coffee extract prepared by the processes described above is obtained as a porous product of finely heterogeneous structure aromatised in depth with aromatic and lipid constituents of coffee. When powdered extracts are being prepared, it is preferable to grind the frozen material before lyophilisation.

The following examples are given for the purposes of illustration only:

EXAMPLE 1

A 1% solution of polystyrene in carbon tetrachloride is prepared and frozen at —70° C. in plates 10 mm. thick which are lyophilised in a vacuum at about —50° C.

These plates are then impregnated with a 2% solution of dextran in water. Penetration of the solution is facilitated by first subjecting the plates to a moderate vacuum.

After freezing at about —40° C., the impregnated plates are lyophilised at —20° C. until a dry product is obtained (2% residual moisture).

The resulting product is a porous composite material of low density (0.03), having the properties of lyophilised polystyrene and dextran.

EXAMPLE 2

A concentrated aqueous solution of coffee solids (about 45%) is transformed into a foam by blowing in gaseous carbon dioxide. The foam is rapidly frozen at about —45° C. in relatively thin plates which are freeze-dried to a dry product having a porous structure.

The plates of freeze-dried coffee are impregnated with a concentrated solution of the lipidic and aromatic constituents of coffee in carbon tetrachloride or Freon 113 so as to obtain a concentration of 0.5 to 1% of these constituents in the final product.

The impregnated plates are frozen at a temperature of about —70° C. and the frozen diluent is eliminated by vacuum sublimation in a conventional freeze-drying apparatus.

In a modification of the process described above, the porous dry coffee extract may be impregnated at a pressure not below about 5.5 kg./cm.$^2$, with a solution of lipidic and aromatic constituents of coffee in liquid carbon dioxide.

By lowering the pressure a spontaneous freezing of the diluent is obtained and it is left to sublime under atmospheric pressure. Freezing may be accelerated by using a refrigerant.

A dry coffee extract is obtained in the form of a porous material having a specific gravity between 0.2 and 0.3 and which contains, in a continuous phase, the soluble constituents of coffee and, in the dispersed phase, the aromatic and lipidic constituents of coffee which are nevertheless intimately mixed within the porees of the continuous phase.

EXAMPLE 3

A biscuit mass is prepared from 1000 g. of water, 1100 g. of milk pwoder, 750 g. of egg white, 100 g. of sugar and 60 g. of a gelling agent. The concentration of dry matter in "solution" is about 44%.

This mass is spread out on trays in the form of flattened sticks, which are frozen at a temperature of around —35° C. and freeze-dried under vacuum (about $10^{-2}$ torr) in a conventional apparatus. A dry product of porous structure is obtained.

A 15% solution of a fatty chocolate preparation is prepared in Freon 113, and the dry product is impregnated with this solution by immersion. In order to facilitate penetration of the solution, the dry product may be subjected briefly to a moderate vacuum.

Alternatively, a savoury biscuit mass may be prepared and impregnated with a 15% solution of a vegetable protein hydrolysate in Freon 113.

The impregnated stick are then rapidly frozen at about $-70°$ C. and freeze-dried in a vacuum of $2.10^{-2}$ torr. A composite product is thus obtained having a finely porous, heterogeneous structure and containing the solid residues of the flavouring agent present in the second solution within its pores.

EXAMPLE 4

43.5 kg. of roasted and ground coffee are moistened with 4.5 kg. of water and stripped with steam until 4.35 kg. of concentrated aroma are obtained.

370 ml. of this solution are twice extracted with 23 ml. portions of Freon 113 and 7 g. of coffee oil are dissolved in the organic phase.

45 ml. of the first solution are emulsified in 3.6 kg. of aqueous coffee extract containing 45% coffee solubles and the emulsion is rapidly frozen at about $-70°$ C. The plates of frozen extract are broken up and ground to a particle size between 0.25 and 2.0 mm.

The frozen particulate extract is then lyophilised in a suitable apparatus under reduced pressure ($5 \times 10^{-2}$ torr). Complete removal of the liquid phase takes about 6 hours, whereupon a powdered coffee extract consisting of porous particles is obtained.

EXAMPLE 5

800 ml. of aqueous coffee extract containing 20% coffee solubles are mixed with a solution of 1.6 g. of coffee oil and 20 ml. of aromatic coffee distillate in dioxan.

100 cc. of the mixed solution are rapidly frozen at a temperature of $-40$ to $-50°$ C. in the form of a thin film which is then lyophilised at reduced pressure ($7 \times 10^{-2}$ torr). The lyophilisation takes about 1½ hours whereupon a lyophilised coffee extract is obtained, having a porous structure and containing the aromatic and lipid constituents of coffee in intimate admixture with the water-soluble constituents.

What is claimed is:
1. A process for preparing a composite material which comprises adding under pressure to a porous material a carbon dioxide solution of at least one second substance differing from said porous material, slowly releasing the pressure to freeze the mixture and lyophilising the mixture to sublime the carbon dioxide.

2. A process according to claim 1 in which the porous material is a lyophilised material.

3. A process according to claim 1 in which lyophilisation is effected at about atmospheric pressure.

4. A process for preparing a composite material which comprises preparing a solution of one solute in liquid carbon dioxide, mixing said solution under pressure with a second solution of a second solute in a diluent and freezing the system by slowly releasing the pressure, and then lyophilising the system to sublime the carbon dioxide and remove said diluent.

5. A process according to claim 4 in which the first solute consists of aromatic and lipid constituents of roasted coffee and the second solution is an aqueous coffee extract.

References Cited

UNITED STATES PATENTS

| 2,951,351 | 9/1960 | Snelling | 62—64 |
| 3,219,461 | 11/1965 | Lamb | 99—199 |
| 3,244,528 | 4/1966 | Torr | 99—199 |
| 3,244,533 | 4/1966 | Clinton | 99—199 |
| 3,297,455 | 1/1967 | Ogden | 99—199 |
| 3,438,792 | 4/1969 | Kruger | 99—199 |
| 2,918,372 | 12/1959 | Blench | 99—71 |
| 3,477,856 | 11/1969 | Schultz | 99—71 |

NORMAN YUDKOFF, Primary Examiner

M. G. MULLEN, Assistant Examiner

U.S. Cl. X.R.

34—5; 62—64; 99—71, 198